(12) United States Patent
Funagi

(10) Patent No.: US 10,762,355 B2
(45) Date of Patent: Sep. 1, 2020

(54) INFORMATION PROCESSING APPARATUS, INFORMATION PROCESSING METHOD, AND STORAGE MEDIUM TO ESTIMATE QUEUE WAITING TIME

(71) Applicant: CANON KABUSHIKI KAISHA, Tokyo (JP)

(72) Inventor: Tetsuhiro Funagi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 80 days.

(21) Appl. No.: 15/807,340

(22) Filed: Nov. 8, 2017

(65) Prior Publication Data

US 2018/0144198 A1 May 24, 2018

(30) Foreign Application Priority Data

Nov. 18, 2016 (JP) .................................. 2016-224965

(51) Int. Cl.
| | |
|---|---|
| *G06T 7/70* | (2017.01) |
| *G06T 7/20* | (2017.01) |
| *G06T 7/292* | (2017.01) |
| *G06K 9/00* | (2006.01) |

(52) U.S. Cl.
CPC ..... *G06K 9/00778* (2013.01); *G06K 9/00369* (2013.01); *G06T 7/20* (2013.01); *G06T 7/292* (2017.01); *G06T 7/70* (2017.01); *G06T 2207/10016* (2013.01); *G06T 2207/30196* (2013.01); *G06T 2207/30232* (2013.01); *G06T 2207/30242* (2013.01)

(58) Field of Classification Search
CPC .. G06T 7/292; G06T 7/20; G06T 7/70; G06K 9/00369; G06K 9/00778; G06K 9/00771; H04N 7/188; H04W 4/029; H04W 8/24; H04W 4/027; H04W 4/80; H04W 4/06; H04W 8/005; H04L 67/18; H04L 67/22; H04B 17/318
See application file for complete search history.

(56) References Cited

U.S. PATENT DOCUMENTS

| | | | | |
|---|---|---|---|---|
| 2014/0267738 | A1* | 9/2014 | Allen ..................... | H04N 7/188 348/156 |
| 2015/0186957 | A1* | 7/2015 | Barr ................... | G06Q 30/0281 705/346 |
| 2016/0191865 | A1* | 6/2016 | Beiser ................ | G06K 9/00221 348/156 |

FOREIGN PATENT DOCUMENTS

| | | |
|---|---|---|
| JP | 2005-316582 A | 11/2005 |
| JP | 2015-215787 A | 12/2015 |

* cited by examiner

*Primary Examiner* — Idowu O Osifade
(74) *Attorney, Agent, or Firm* — Canon, U.S.A., Inc. IP Division

(57) ABSTRACT

An information processing apparatus includes an acquisition unit that acquires a number of objects included in a queue as a group of objects and an estimation unit that executes estimation processing of estimating a waiting time of the queue based on the acquired number of objects included in the queue and history information relating to a number of objects having moved out of the queue, where the estimation unit executes the estimation processing based on a previous estimated waiting time.

11 Claims, 12 Drawing Sheets

INFORMATION PROCESSING APPARATUS, INFORMATION PROCESSING METHOD, AND STORAGE MEDIUM TO ESTIMATE QUEUE WAITING TIME

BACKGROUND

Field

The present disclosure relates to an information processing apparatus, an information processing method, and a storage medium.

Description of the Related Art

Conventionally, there has been known a system that estimates and notifies a waiting time of a waiting queue when objects, such as persons, form a waiting queue.

For example, as a system for estimating and notifying a waiting time, there has been known a system that captures an image of users standing in a queue, detects moving tracks of the users by analyzing the captured image of the users, and identifies a waiting queue formed by the users based on the detected moving tracks of the users. Japanese Patent Application Laid-Open No. 2005-316582 discusses a system where waiting time necessary for a user to wait until the user can use a facility is calculated and notified based on an average time taken for a user to use the facility and a waiting queue of identified users.

Japanese Patent Application Laid-Open No. 2015-215787 discusses a technique of estimating a waiting time from a captured image of persons standing in a queue by recognizing a person or a group of persons and measuring a moving time of a specific person or a group from a plurality of captured images.

The above-described conventional techniques do not provide for precisely estimating a waiting time when there is variation in progress or length of a waiting queue at a facility such as an airport desk, an entrance of a restaurant, or a taxi stand.

SUMMARY

According to an aspect of the present disclosure, an information processing apparatus includes an acquisition unit configured to acquire a number of objects included in a queue, and an estimation unit configured to execute estimation processing of estimating a waiting time of the queue based on the acquired number of objects and history information relating to a number of objects having moved out of the queue per unit time, wherein the estimation unit sets the unit time based on a previous estimated waiting time to estimate the waiting time of the queue.

Further features of the present disclosure will become apparent from the following description of exemplary embodiments with reference to the attached drawings.

DESCRIPTION OF THE EMBODIMENTS

Exemplary embodiments will be described below with reference to the appended drawings.

Processing executed by a waiting time estimation system according to a first exemplary embodiment will now be described.

Figure 1A:
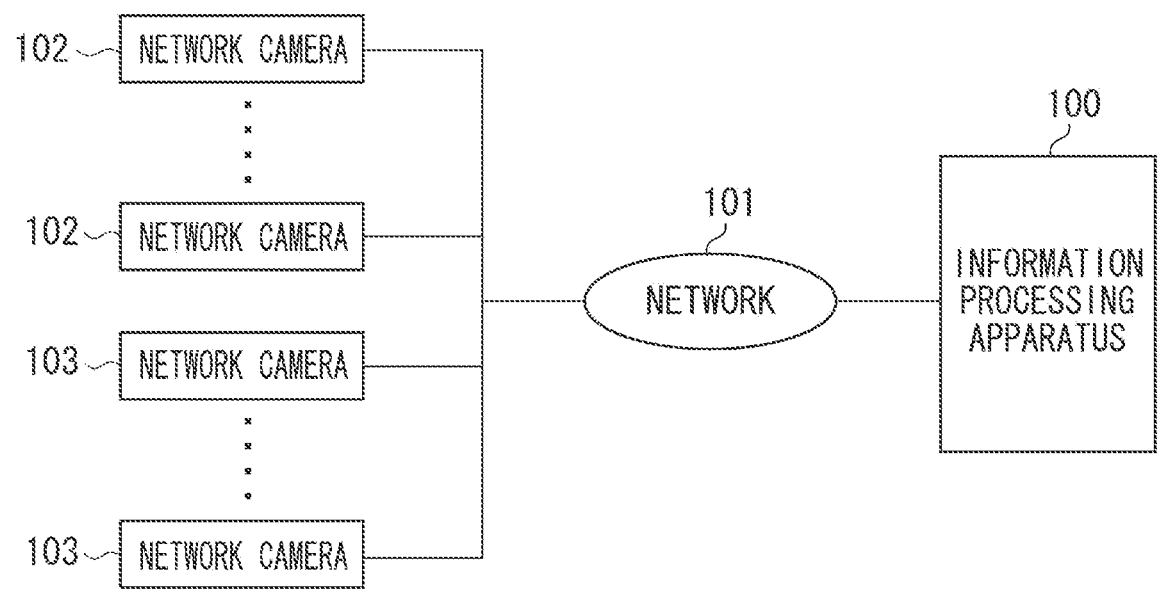
FIGS. 1A and 1B are diagrams illustrating a system configuration of a waiting time estimation system.

FIG. 1A is a block diagram illustrating an example of a system configuration of the waiting time estimation system of the present exemplary embodiment. The waiting time estimation system includes an information processing apparatus 100, a network camera 102, and a network camera 103. The information processing apparatus 100, the network camera 102, and the network camera 103 are connected via a network 101.

The waiting time estimation system estimates a waiting time in a waiting queue. A waiting queue in which objects stand is an example of a queue as a group of objects. A waiting time of the waiting queue refers to time taken for an object positioned at a tail end of the waiting queue to move out of the waiting queue. In the present exemplary embodiment, it is assumed that the waiting time estimation system estimates a waiting time of a waiting queue consisting of persons each waiting for the person's turn at a taxi stand. In other words, in the present exemplary embodiment, the waiting time estimation system estimates a waiting time of a waiting queue consisting of persons as objects.

The waiting time estimation system can estimate a waiting time of various different types of waiting queues. For example, the waiting time estimation system can estimate a waiting time of a waiting queue consisting of persons each waiting for their respective turn at an automated teller machine (ATM) of a banking facility, a facility such as an amusement machine, a ride, or an amusement attraction in an amusement park or an entertainment park, or a bus station. The waiting time estimation system can also estimate a waiting time of a waiting queue consisting of semi-processed goods ready to be processed on a production line of a factory. In such a case, the semi-processed goods are the objects that constitute the waiting queue. The waiting time estimation system can also estimate a waiting time of a waiting queue consisting of cargoes ready to be sorted into transportation destinations on a lane in a warehouse where cargoes are temporarily stored. In such a case, the cargoes are the objects that constitute the waiting queue.

The information processing apparatus 100 can be a personal computer (PC), a server apparatus, or a tablet apparatus that acquires an image, such as a still image or a moving image, captured by the network cameras 102 and 103 and estimates a waiting time of a waiting queue. The network camera 102 captures an image in a vicinity of an exit of the waiting queue and transmits the captured still image or the moving image to the information processing apparatus 100. The network camera 103 captures an image of the waiting queue and transmits the captured image to the information processing apparatus 100.

Figure 1B:
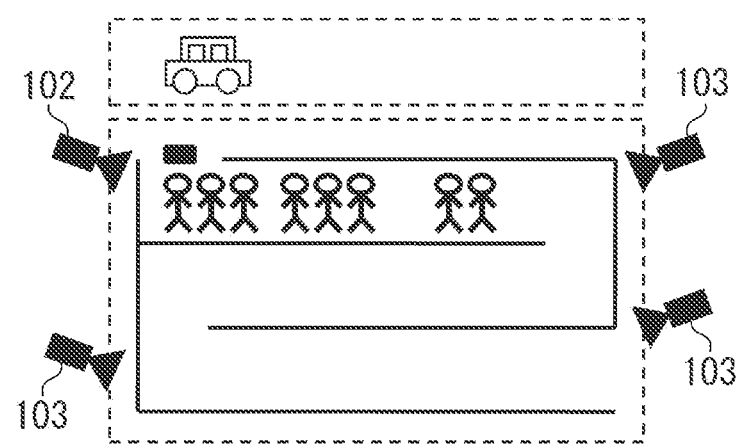

FIG. 1B is a diagram illustrating an example of an implementation state of the waiting time estimation system. In the example of FIG. 1B, persons existing in a region divided by a preset partition expressed by a solid line constitute a waiting queue. One or more network cameras 103 capture the entire waiting queue and transmit the captured images to the information processing apparatus 100. The information processing apparatus 100 detects persons from the images transmitted from the network cameras 103 and takes a number of detected persons as a number of objects included in the waiting queue. One or more network cameras 102 capture the vicinity of the exit of the waiting queue and transmit the captured images to the information processing apparatus 100. The information processing apparatus 100 detects a person moving out of the waiting queue from the images transmitted from the network cameras 102 and stores the detection time every time. For example, the information processing apparatus 100 detects a person passing through the exit of the waiting queue from a plurality of images continuing in a chronological order.

In the example of FIG. 1B, the network cameras 103 are arranged to be able to capture the waiting queue. The network camera 102 is arranged to be able to capture the exit for the waiting queue.

Figure 2A:
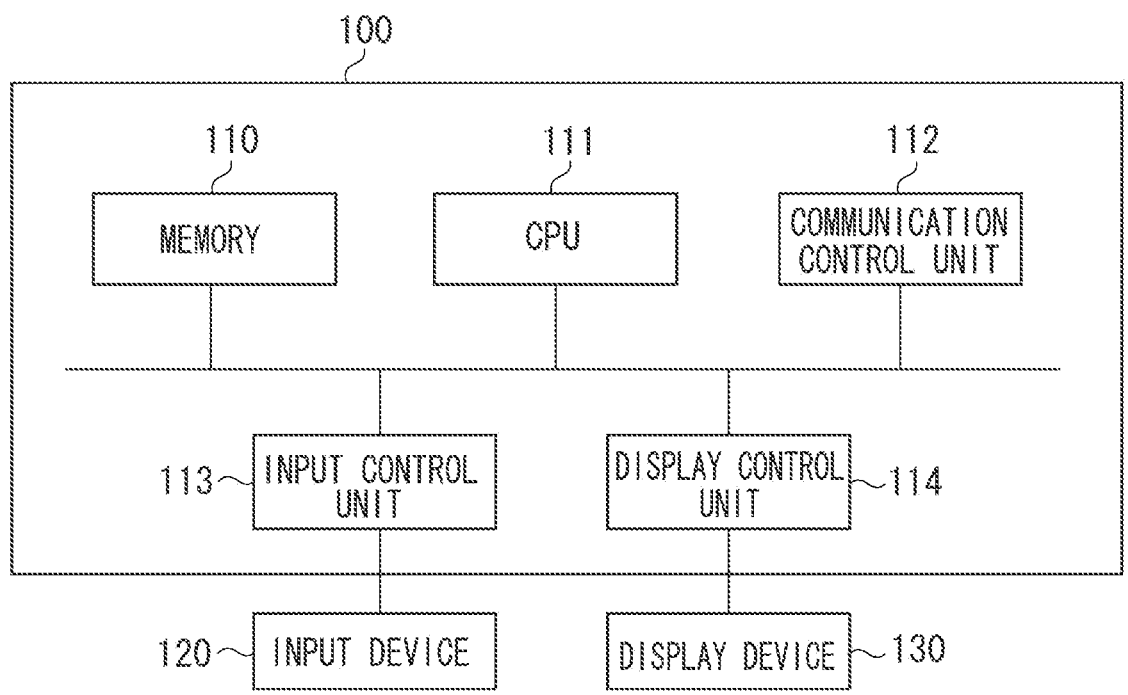
FIGS. 2A and 2B are block diagrams illustrating hardware configurations of an information processing apparatus and a network camera.

FIG. 2A is a block diagram illustrating an example of a hardware configuration of the information processing apparatus 100. The information processing apparatus 100 includes a memory 110, a central processing unit (CPU) 111, a communication control unit 112, an input control unit 113, and a display control unit 114.

The memory 110 is a storage device such as a hard disk, an optical disk, a memory card, or a solid state drive for storing various programs, various types of setting data, various types of threshold value data, and captured image data of a waiting queue. The CPU 111 is a central processing unit for controlling the processing of the information processing apparatus 100. The communication control unit 112 is used for communicating with an external apparatus via a network. The input control unit 113 controls input of information to the information processing apparatus 100 via an input device 120. The display control unit 114 controls display of a screen on a display device 130. In the present exemplary embodiment, while the information processing apparatus 100 and the display device 130 are described as independent apparatuses, the display device 130 can integrated with the information processing apparatus 100. The waiting time estimation system can include a plurality of display devices as the display device 130.

The CPU 111 executes processing based on a program stored in the memory 110, so that a function of the information processing apparatus 100 described below in FIGS. 3 to 6 and processing of flowcharts described below in FIGS. 7 and 8 can be realized.

Figure 2B:
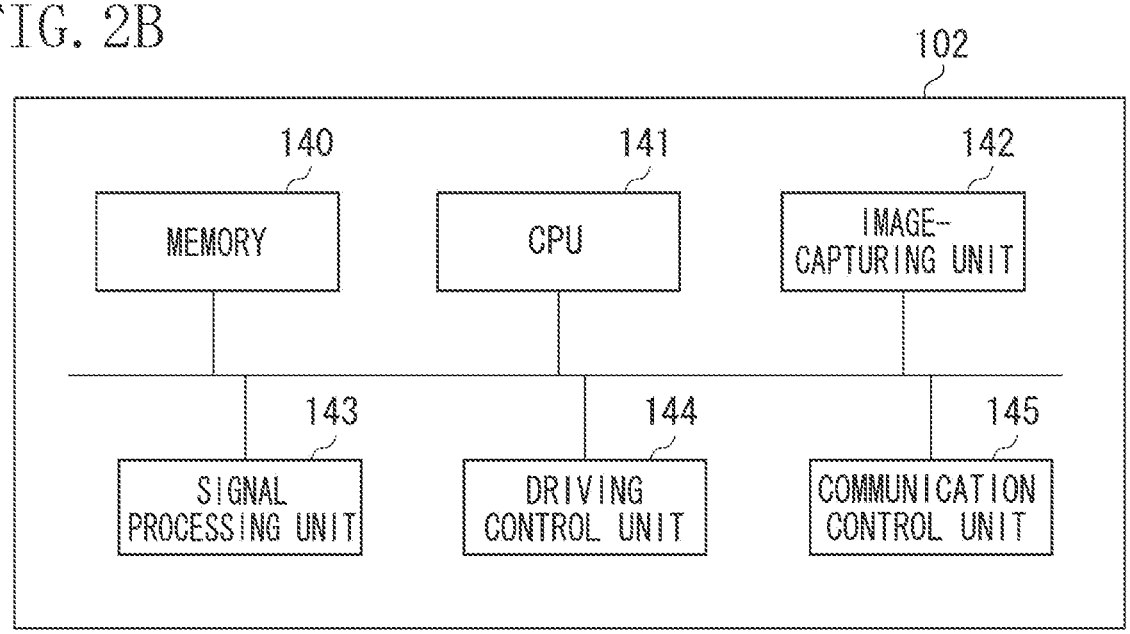

FIG. 2B is a block diagram illustrating an example of a hardware configuration of the network camera 102. The network camera 102 includes a memory 140, a CPU 141, an image-capturing unit 142, a signal processing unit 143, a driving control unit 144, and a communication control unit 145.

The memory 140 is a storage device such as a hard disk, an optical disk, a memory card, or a solid state drive that stores various programs, various types of setting data, and captured image data of the waiting queue. The CPU 141 is a central processing unit for controlling the processing of the network camera 102.

The image-capturing unit 142 includes an image sensor and an optical system for forming an object image on the image sensor, and captures an image on the image sensor by making an intersection point of an optical axis of the optical system and the image sensor as an imaging center. The image-capturing unit 142 is an image sensor such as a complementary metal-oxide semiconductor (CMOS) sensor or a charge coupled device (CCD) sensor.

The signal processing unit 143 executes signal processing on the image signal captured by the image-capturing unit 142. For example, the signal processing unit 143 executes coding of the image signal captured by the image-capturing unit 142. For example, the signal processing unit 143 executes coding of the image signal captured by the image-capturing unit 142 by using a coding method such as a joint photographic experts group (JPEG) coding method.

The signal processing unit 143 can execute coding of the image signal captured by the image-capturing unit 142 by using a coding method of the Moving Picture Experts Group Phase 4 (MPEG-4) Advanced Visual Communication (AVC) H.264 (hereinafter, referred to as "H.264"). The signal processing unit 143 can execute coding of the image signal captured by the image-capturing unit 142 by using the high efficiency video coding (HEVC) coding method. In addition, the signal processing unit 143 can select a coding method from among any other of a plurality of coding methods to execute coding.

The driving control unit 144 executes control of changing an image-capturing direction and a field angle of the image-capturing unit 142. In the present exemplary embodiment, the image-capturing unit 142 can change the image-capturing direction in a pan direction and a tilt direction to change the image-capturing field angle. The network camera 102 does not necessarily require a function of changing the image-capturing direction in the pan and the tilt directions, and does not necessarily require a function of changing the field angle.

The communication control unit 145 is used for communicating with an external apparatus, such as the information processing apparatus 100, via the network 101. The communication control unit 145 transmits information of the captured image processed by the signal processing unit 143 to the information processing apparatus 100. The communication control unit 145 receives control commands to the network camera 102 transmitted from the information processing apparatus 100.

The CPU 141 executes processing based on a program stored in the memory 140, so that a function and processing of the network camera 102 are realized.

A hardware configuration of the network camera 103 is similar to that of the network camera 102, as such, a separate block diagram illustrating an example of a hardware configuration of the network camera 103 is not provided. A CPU of the network camera 103 executes processing based on a program stored in a memory of the network camera 103, so that a function and processing of the network camera 103 can be realized.

Figure 3:
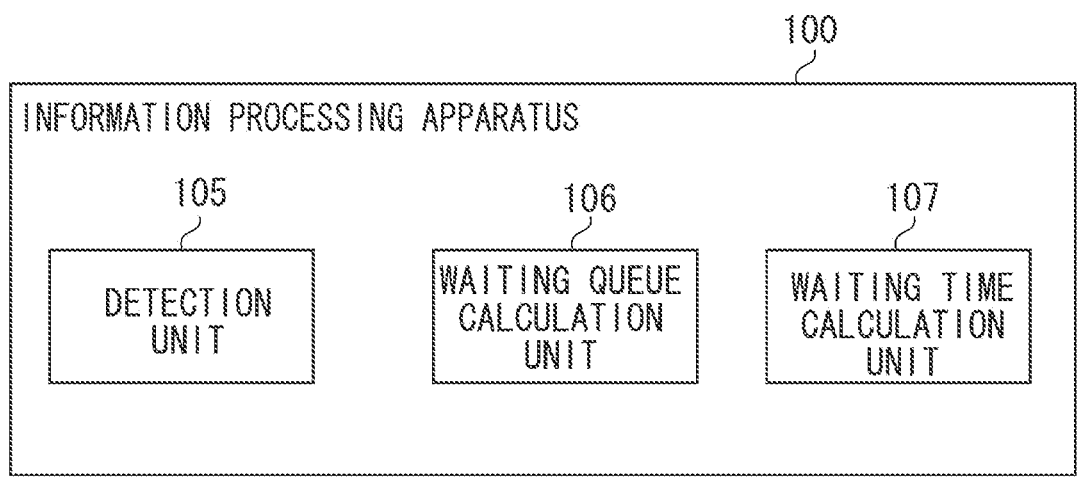
FIG. 3 is a block diagram illustrating a functional configuration of the information processing apparatus.

FIG. 3 is a block diagram illustrating an example of a functional configuration of the information processing apparatus 100. The information processing apparatus 100 includes a detection unit 105, a waiting queue calculation unit 106, and a waiting time calculation unit 107.

The detection unit 105 analyzes an image at the exit of the waiting queue transmitted from the network camera 102 to recognize the objects standing in the waiting queue and detect the objects moving out of the waiting queue. Then, the detection unit 105 stores correspondence information about a number of detected objects having moved out of the waiting queue and a time period when an object moves out of the waiting queue in the memory 110 as history information. The history information indicates when and how many objects move out of the waiting queue. The correspondence information about the number of objects having moved out of the waiting queue and the time period when the objects move out of the waiting queue is an example of the history information.

The waiting queue calculation unit 106 recognizes an object (person) from the image of the waiting queue transmitted from the network camera 103 and acquires a number of objects included (standing) in the waiting queue.

The waiting time calculation unit 107 calculates a waiting time of the waiting queue based on the correspondence information about a number of objects having moved out of the waiting queue and a time period when the object moves out of the waiting queue stored by the detection unit 105 and a number of objects included in the waiting queue acquired by the waiting queue calculation unit 106. While it is assumed that all of the detection unit 105, the waiting queue calculation unit 106, and the waiting time calculation unit 107 are incorporated in a single information processing apparatus 100, the respective units 105, 106, and 107 can be separately incorporated into a plurality of information processing apparatuses. In such a case, the plurality of information processing apparatuses cooperatively executes the processing similar to that of the information processing apparatus 100.

Figure 4:
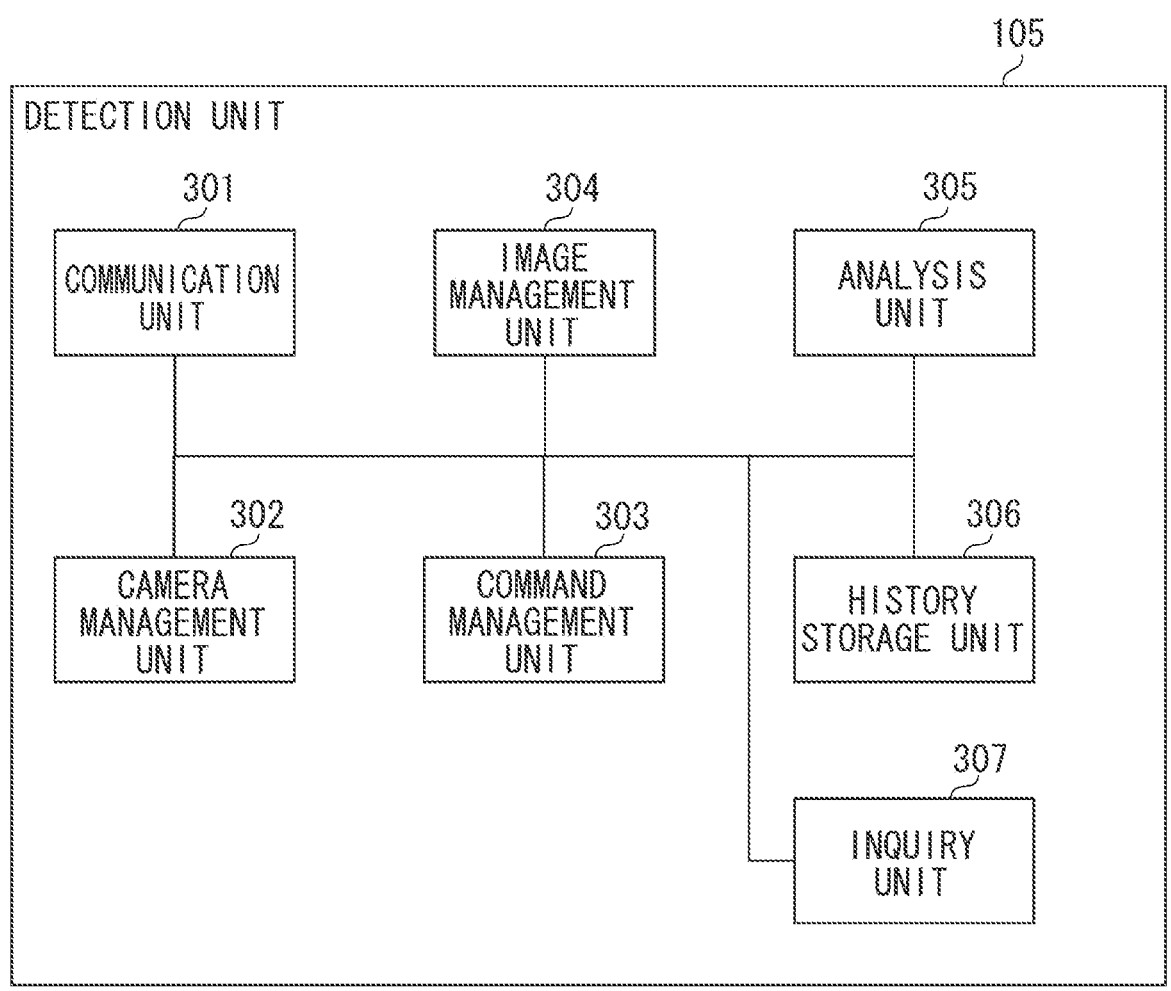
FIG. 4 is a block diagram illustrating details of a detection unit.

FIG. 4 is a block diagram illustrating an example of details of the detection unit 105. The detection unit 105 includes a communication unit 301, a camera management unit 302, a command management unit 303, an image management unit 304, an analysis unit 305, a history storage unit 306, and an inquiry unit 307.

The communication unit 301 communicates with other apparatuses, such as the network cameras 102 and 103, via the communication control unit 112. The camera management unit 302 acquires information about a state of the camera, such as a state of a pan head platform mechanism or an image-capturing mechanism, from the network cameras 102 and 103, and stores the acquired information in the memory 110 to manage the information. The command management unit 303 generates commands for changing a state of the pan head platform mechanism or the image-capturing mechanism to a specified state and commands for requesting images from the network cameras 102 and 103, stores the commands in the memory 110 to manage the commands, and transmits the commands to the network cameras 102 and 103.

The image management unit 304 acquires the image, such as a still image or a moving image, transmitted from the network camera 102, and stores the image in the memory 110 to manage the image. The analysis unit 305 executes detection and tracking of a human body with respect to the image acquired from the network camera 102 to detect an object moving out of the waiting queue. The memory 110 previously stores information about a region occupied by the waiting queue in the image acquired from the network camera 102. For example, the analysis unit 305 acquires information about a region occupied by the waiting queue in the image acquired from the network camera 102 from the memory 110, and detects an object moving out of the region indicated by the acquired information as the object moving out of the waiting queue.

When the object moving out of the waiting queue is detected by the analysis unit 305, the history storage unit 306 stores correspondence information about the number of objects moving out of the waiting queue and a time period when the object has moved out of the waiting queue in the memory 110. The history storage unit 306 can store information about a detected time in the memory 110 as the history information every time the object moving out of the waiting queue is detected by the analysis unit 305. The inquiry unit 307, based on an inquiry about the history information, extracts information corresponding to the inquiry from the history information stored by the history storage unit 306 and transmits the extracted information to an inquiry source.

Figure 5:
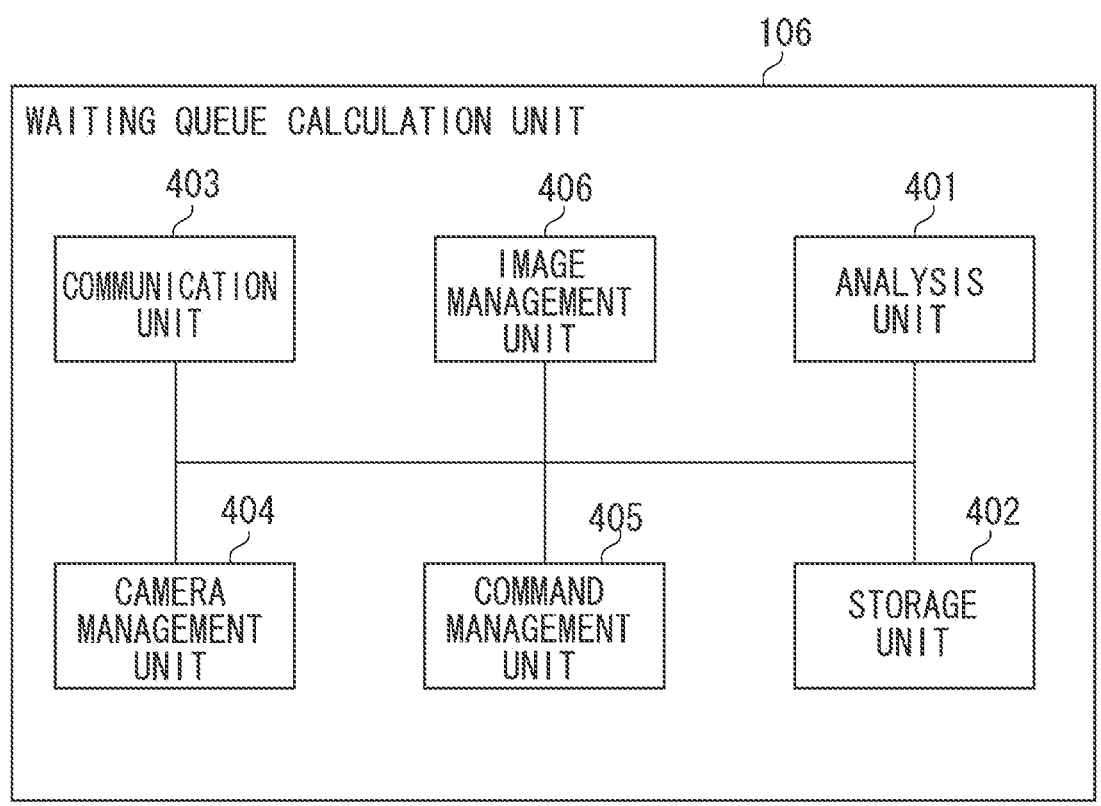
FIG. 5 is a block diagram illustrating details of a waiting queue calculation unit.

FIG. 5 is a block diagram illustrating an example of the waiting queue calculation unit 106. The waiting queue calculation unit 106 includes an analysis unit 401, a storage unit 402, a communication unit 403, a camera management unit 404, a command management unit 405, and an image management unit 406. The communication unit 403, the camera management unit 404, the command management unit 405, and the image management unit 406 are similar to the communication unit 301, the camera management unit 302, the command management unit 303, and the image management unit 304 respectively, and thus a detailed description is omitted herein.

The analysis unit 401 detects an object (person) from the image transmitted from the network camera 103 and acquires a number of objects included in the waiting queue. The analysis unit 401 can acquire the number of objects included in the entire waiting queue from the images transmitted from the plurality of network cameras 103. The analysis unit 401 can acquire the number of objects included in the entire waiting queue from an image that is captured by a single network camera 103 and includes the entire waiting queue. The analysis unit 401 can acquire the number of objects included in the waiting queue by multiplying the number of objects included in a region of the waiting queue in the image captured by the network camera 103 by a ratio of a region of the entire waiting queue to the region of the waiting queue in that image.

The storage unit 402 stores information about the number of objects included in the waiting queue acquired by the analysis unit 401 in the memory 110.

Figure 6:
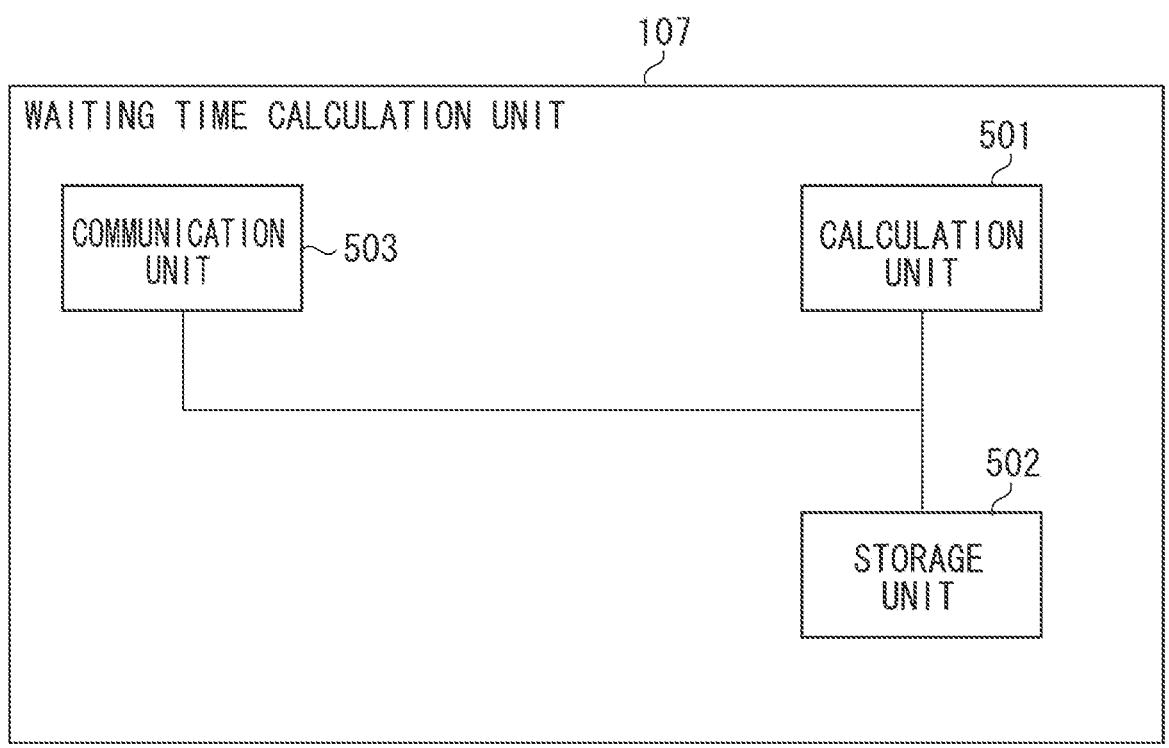
FIG. 6 is a block diagram illustrating details of a waiting time calculation unit.

FIG. 6 is a block diagram illustrating an example of the waiting time calculation unit 107. The waiting time calculation unit 107 includes a calculation unit 501, a storage unit 502, and a communication unit 503.

The communication unit 503 is similar to the communication unit 301, and thus a detailed description is omitted herein.

The calculation unit 501, for example, inquires of the inquiry unit 307 about history information during a set period. The inquiry unit 307 acquires the history information during a period corresponding to the inquiry from the history information stored by the history storage unit 306 and transmits the acquired history information to the calculation unit 501. The calculation unit 501 calculates a waiting time of the waiting queue based on the history information received from the inquiry unit 307 and the number of objects included in the waiting queue acquired by the analysis unit 401.

The storage unit 502 stores information about the waiting time calculated by the calculation unit 501 in the memory 110.

Figure 7:
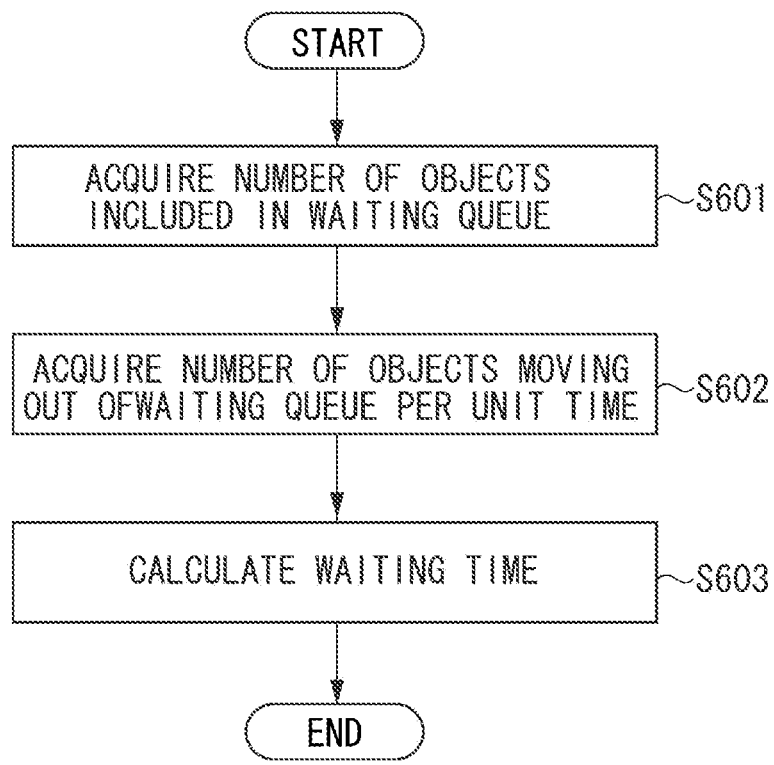
FIG. 7 is a flowchart illustrating processing by the information processing apparatus.

FIG. 7 is a flowchart illustrating an example of estimation processing of the waiting time of the waiting queue executed by the information processing apparatus 100.

In step S601, the calculation unit 501 acquires a number of objects included in the waiting queue from the waiting queue calculation unit 106. Then, the waiting queue calculation unit 106 transmits the information indicating the number of objects included in the waiting queue stored by the storage unit 402 to the calculation unit 501. The calculation unit 501 acquires the number indicated by the information transmitted from the waiting queue calculation unit 106 as the number of objects included in the waiting queue.

In step S602, the calculation unit 501 requests history information during a period of set unit time (e.g., 1 minute, or 3 minutes) just before the current time from the inquiry unit 307. The inquiry unit 307 acquires the history information during a period corresponding to the inquiry from the memory 110 and transmits the history information to the calculation unit 501. The calculation unit 501, based on the history information transmitted from the inquiry unit 307, acquires a number of objects having moved out of the waiting queue per set unit time just before the current time.

In step S603, the calculation unit 501 divides the number of objects included in the waiting queue acquired in step S601 by the number of objects having moved out of the waiting queue per unit time acquired in step S602, and multiplies the acquired quotient by the unit time to calculate a waiting time. Then, the calculation unit 501 estimates that the waiting time of the waiting queue is the calculated waiting time.

As described above, through the processing of the present exemplary embodiment, the waiting time estimation system acquires the number of objects moving out of the waiting queue per unit time from the history information during a period of set unit time just before the current time. Then, the waiting time estimation system divides the number of objects included in the waiting queue by the acquired number, and multiplies the acquired quotient by the unit time to estimate the waiting time of the waiting queue. The waiting time estimation system can, by using the history information for executing the estimation processing of the waiting time of the waiting queue even if variation arises in the progress or the length of the waiting queue, estimate the waiting time of the waiting queue more precisely than when the history information is not used for executing the estimation processing.

In the first exemplary embodiment, the waiting time estimation system uses history information during a period of unit time just before the current time to execute estimation processing of the waiting time of the waiting queue. However, in the present example of the taxi stand, time taken for a taxi to arrive or time taken for executing processing at a service counter is not constant, and can vary depending on a day or a time period. Therefore, the number of objects moving out of the waiting queue per unit time can vary depending on a day or a time period. Accordingly, there is a case where the history information during a period of unit time just before the current time does not always precisely indicate a state of objects moving out of the waiting queue. As a result, there can be a case where the waiting time estimation system cannot always precisely estimate the waiting time of the waiting queue based on the history information during a period of unit time just before the current time.

Therefore, in the present exemplary embodiment, the waiting time estimation system acquires a waiting time of the waiting queue while updating the history information used for executing the estimation processing of the waiting time of the waiting queue. Then, when a difference between a period corresponding to the history information used for the estimation processing of the waiting time of the waiting queue and the acquired waiting time is less than a threshold value, the waiting time estimation system assumes that estimation is executed appropriately and determines the acquired waiting time as a final estimation result.

A system configuration of the waiting time estimation system, a hardware configuration, and a functional configuration of each of the system constituent elements of the present exemplary embodiment are similar to those described in the first exemplary embodiment.

Figure 8:
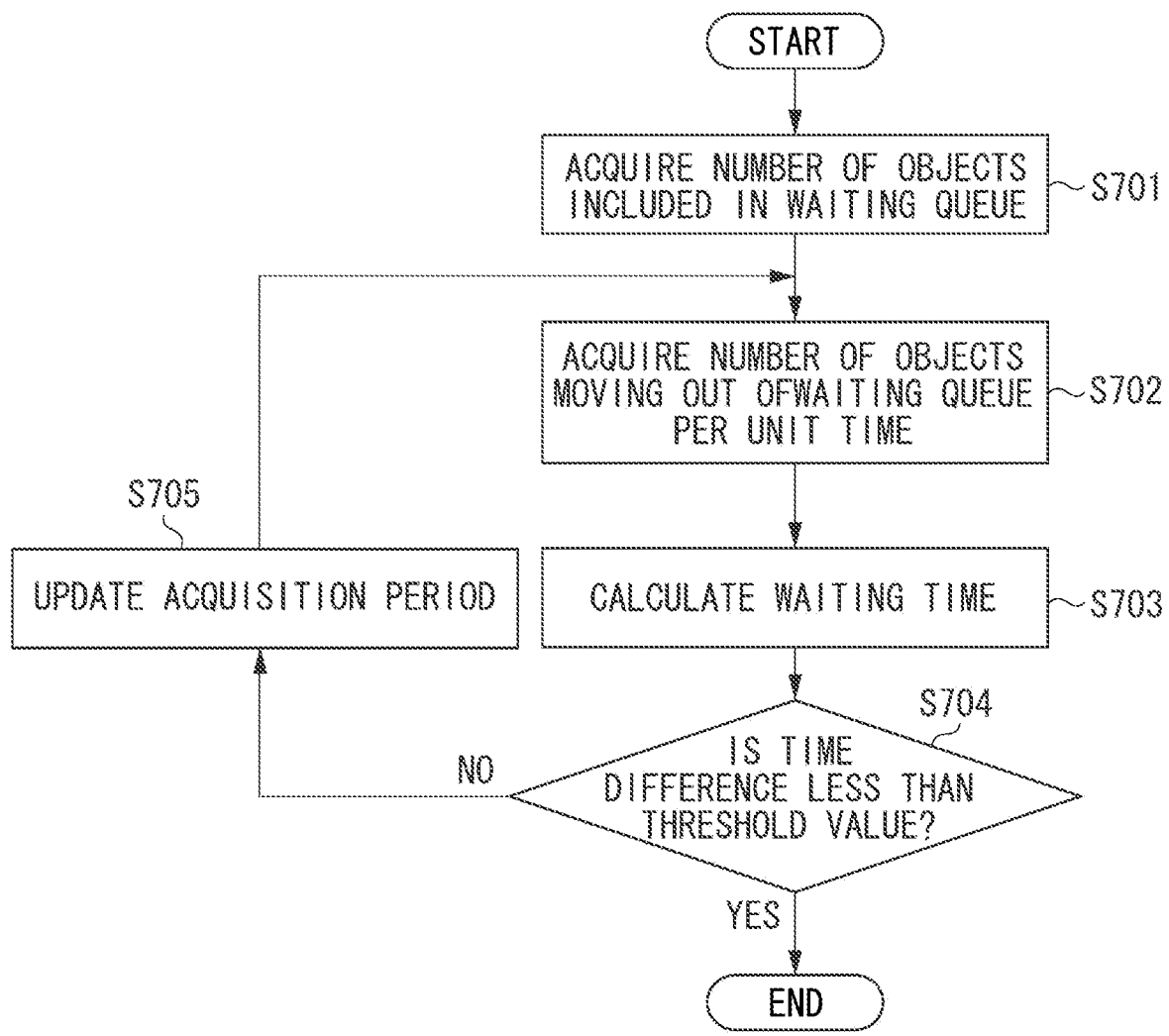
FIG. 8 is a flowchart illustrating processing by the information processing apparatus.

FIG. 8 is a flowchart illustrating an example of estimation processing of a waiting time of a waiting queue executed by the information processing apparatus 100.

In step S701, the calculation unit 501 requests the number of objects included in the waiting queue from the waiting queue calculation unit 106. The waiting queue calculation unit 106, based on the request from the calculation unit 501, acquires information indicating the number of objects included in the waiting queue stored by the storage unit 402 from the memory 110, and transmits the acquired information to the calculation unit 501. With this processing, the calculation unit 501 acquires the number of objects included in the waiting queue.

In step S702, the calculation unit 501 requests history information during a set period from the inquiry unit 307. Hereinafter, this set period is referred to as an acquisition period. In addition, for example, an initial value of the acquisition period can be a period of unit time just before the current time, or can be another period, such as a period of unit time just before the current time on another day. The inquiry unit 307 acquires the history information during the acquisition period corresponding to the inquiry from the memory 110, and transmits the history information to the calculation unit 501. The calculation unit 501, based on the history information transmitted from the inquiry unit 307, acquires a number of objects having moved out of the waiting queue per unit time in the acquisition period. For example, when the acquisition period is a period of 10 minutes just before the current time and the unit time is one minute, the calculation unit 501 executes the following processing. The calculation unit 501 acquires a number of objects having moved out of the waiting queue in the acquisition period from the history information during the acquisition period acquired from the inquiry unit 307. Then, the calculation unit 501 divides the acquired number of objects by a value acquired by dividing a length of the acquisition period by a length of the unit time. The calculation unit 501 divides the acquired number of objects by 10 that is a value acquired by dividing 10 minutes as a length of the acquisition period by one minute as a length of the unit time. Through this calculation, the calculation unit 501 acquires the number of objects having moved out of the waiting queue per unit time in the acquisition period.

In step S703, the calculation unit 501 divides the number of objects included in the waiting queue acquired in step S701 by the number of objects having moved out of the waiting queue per unit time acquired in step S702 to calculate the waiting time of the waiting queue. The storage unit 502 stores the waiting time of the waiting queue calculated by the calculation unit 501 in the memory 110.

In step S704, the calculation unit 501 determines whether a difference between the waiting time of the waiting queue acquired in step S703 and the acquisition period used in step S701 is less than a set threshold value. If the calculation unit 501 determines that the difference is equal to or greater than the threshold value (NO in step S704), the processing proceeds to step S705. If the calculation unit 501 determines that the difference is less than the threshold value (YES in step S704), the waiting time of the waiting queue acquired in step S703 is determined as a final estimation result, and the processing in FIG. 8 ends.

In step S705, the calculation unit 501 updates a value of the acquisition period to a value of the waiting time of the waiting queue acquired in step S703, and the processing proceeds to step S702.

The processing in steps S702 to S705 is one example of the estimation processing for estimating the waiting time of the waiting queue.

Figure 9:
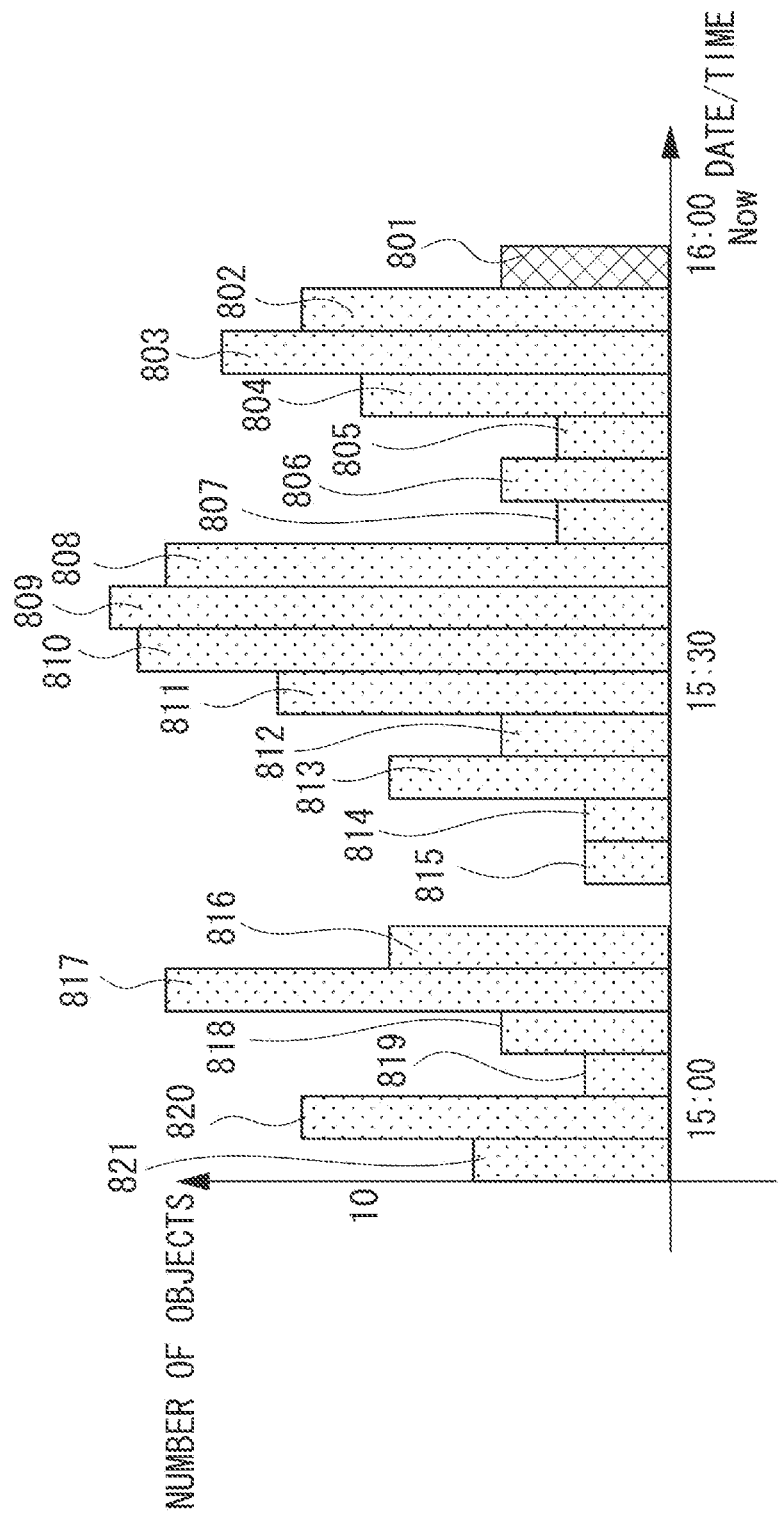
FIG. 9 is a graph illustrating history information used for calculating a waiting time.
Figure 10:
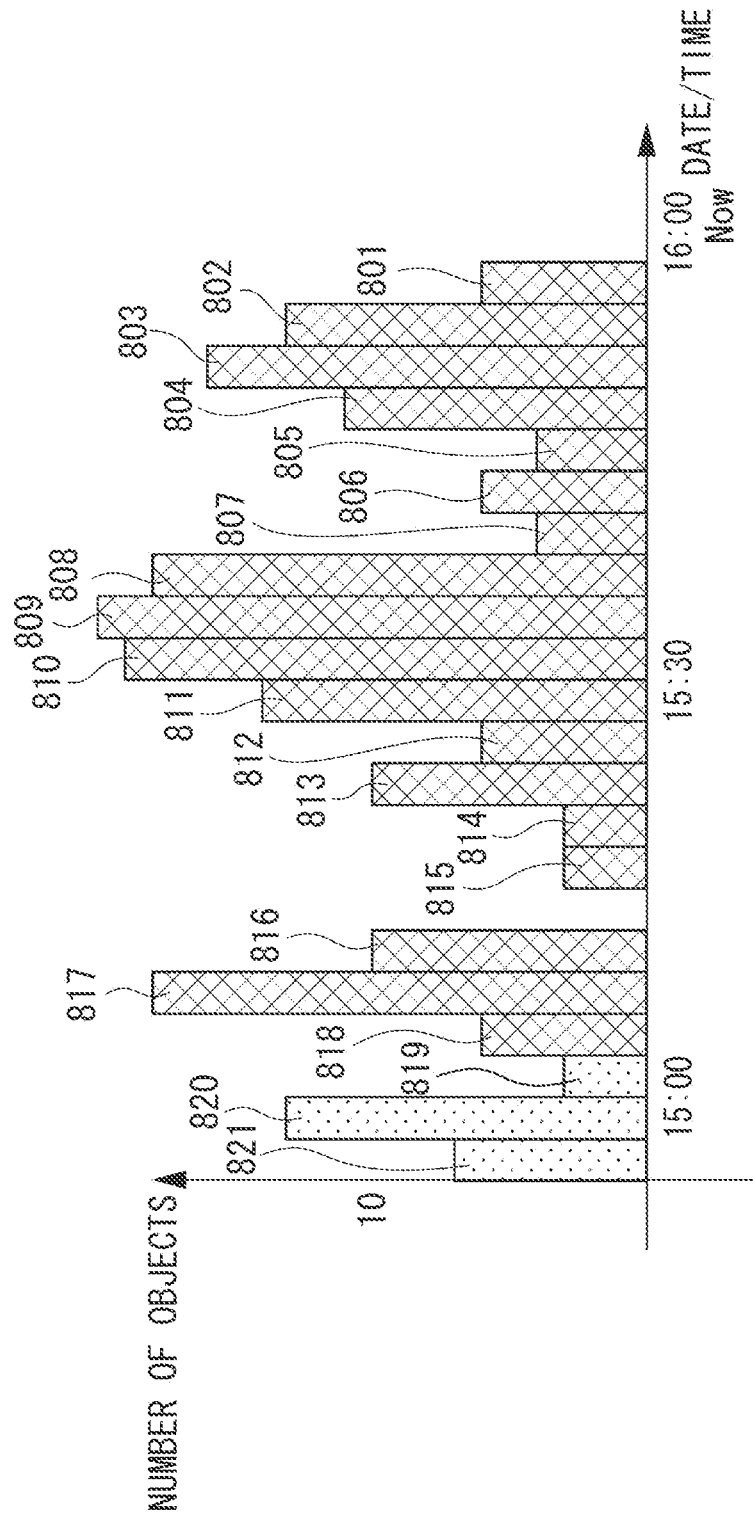
FIG. 10 is a graph illustrating history information used for calculating a waiting time.
Figure 11:
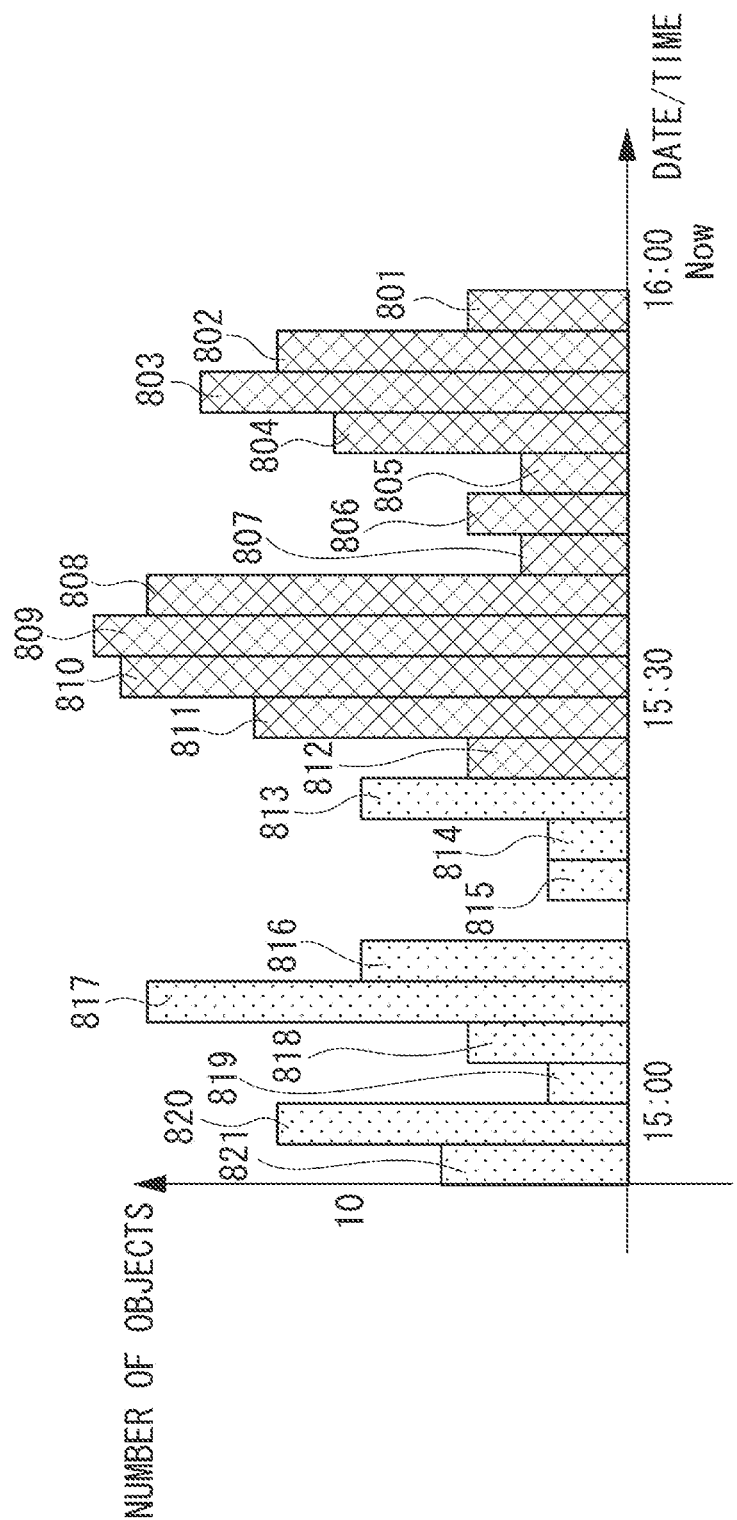
FIG. 11 is a graph illustrating history information used for calculating a waiting time.

FIGS. 9 to 11 are graphs illustrating examples of history information used for calculating the waiting time. More specifically, the bar graphs in FIGS. 9 to 11 illustrate examples of the history information stored by the history storage unit 306. The current time is assumed to be 16:00. Each of data 801 to 821 in the bar graphs in FIGS. 9 to 11 illustrates a number of objects moving out of the waiting queue added up in every 3 minutes during a period from 14:54 to the current time.

An example of the processing in FIG. 8 will now be described with reference to FIGS. 9 to 11. It is assumed that the number of objects included in the waiting queue is 113, the set threshold value used in step S704 is 10 minutes, an initial value of the acquisition period is 3 minutes just before the current time, and the unit time is 1 minute.

In step S701, the calculation unit 501 acquires 113 as the number of objects included in the waiting queue. In step S702, the calculation unit 501 acquires the history information indicating that six objects have moved out of the waiting queue in 3 minutes just before the current time. Then, the calculation unit 501 calculates the number of objects having moved out of the waiting queue per unit time in the acquisition period as "6/(3/1)=2". In step S703, the calculation unit 501 divides 113 acquired in step S701 by 2 acquired in step S702, and multiplies the acquired quotient by 1 minute to calculate the waiting time of the waiting queue as 56.5 minutes. In step S704, the calculation unit 501 determines that a difference between 56.5 minutes calculated in step S703 and the acquisition period of 3 minutes is the set threshold value of 10 minutes or more, so that the processing proceeds to step S705. The calculation unit 501 updates the acquisition period to 56.5 minutes just before the current time in step S705, and the processing proceeds to step S702. The data 801 in FIG. 9 is data indicating the history information used in step S702, which indicates a state where six objects have moved out of the waiting queue in a period from 15:57 to 16:00.

In a second round of step S702, the calculation unit 501 acquires history information during a period of 56.5 minutes just before the current time as the acquisition period. In the present example, because the history information is information added up in every 3 minutes, the calculation unit 501 cannot acquire the history information during a period from 56.5 minutes to 54 minutes before the current time. Thus, instead of acquiring the history information during a period from 56.5 minutes to 54 minutes before the current time, the calculation unit 501 acquires the history information during a period from 57 minutes to 54 minutes before the current time. In other words, the calculation unit 501 acquires the history information during a period of 57 minutes just before the current time. Alternatively, the calculation unit 501 can acquire the history information during a period of 54 minutes just before the current time.

The calculation unit 501, based on the acquired history information, identifies that a number of objects having moved out of the waiting queue in 57 minutes just before the current time is 181 pieces. Then, the calculation unit 501 divides 181 by 57 to calculate the number of objects moving out of the waiting queue per unit time in the acquisition period as 3.17 pieces. In a second round of step S703, the calculation unit 501 divides 113 as the number of objects included in the waiting queue by a value 3.17 acquired in step S702, and multiplies the acquired quotient by the unit time to calculate the waiting time of the waiting queue as 35.6 minutes. In a second round of step S704, the calculation unit 501 determines that a difference between 35.6 minutes calculated in step S703 and 56.5 minutes as a length of the acquisition period is 10 minutes or more, and the processing proceeds to step S705. In a second round of step S705, the calculation unit 501 updates the acquisition period to a period of 35.6 minutes just before the current time calculated in step S703, and the processing proceeds to step S702. The data 801 to 818 in FIG. 10 is data indicating the history information used in the second round of step S702, which indicates the history information during a period from 15:03 to the current time of 16:00.stopped Next, in a third round of step S702, the calculation unit 501 acquires history information during a period of 35.6 minutes just before the current time as the acquisition time. In the present example, because the history information is information added up in every 3 minutes, the calculation unit 501 cannot acquire the history information during a period from 35.6 minutes to 33 minutes before the current time. Therefore, instead of acquiring the history information during a period from 35.6 minutes to 33 minutes before the current time, the calculation unit 501 acquires the history information during a period from 36 minutes to 33 minutes before the current time. In other words, the calculation unit 501 acquires the history information during a period of 36 minutes just before the current time. Alternatively, the calculation unit 501 can acquire the history information during a period of 33 minutes just before the current time.

The calculation unit 501, based on the acquired history information, identifies that a number of objects having moved out of the waiting queue in 36 minutes just before the current time is 134 pieces. Then, the calculation unit 501 divides 134 by 36 to calculate the number of objects moving out of the waiting queue per unit time in the acquisition period as 3.72 pieces. In a third round of step S703, the calculation unit 501 divides 113 as the number of objects included in the waiting queue by a value 3.72 acquired in step S702, and multiplies the acquired quotient by the unit time to calculate the waiting time of the waiting queue as 30.4 minutes. In a third round of step S704, because a difference between 30.4 minutes calculated in step S703 and 35.6 minutes as a length of the acquisition period is less than 10 minutes, the calculation unit 501 determines 30.4 minutes as a final estimation result of the waiting time of the waiting queue and ends the processing in FIG. 8. The data 801 to 812 in FIG. 11 is data indicating the history information used in the third round of step S702, which indicates the history information during a period from 15:24 to the current time of 16:00.

In the processing in FIG. 8, in a case where the calculation unit 501 determines that a difference between the waiting time of the waiting queue calculated in step S703 and the acquisition period is greater than or equal to the set threshold value in step S704, even though the processing in steps S702 and S703 is executed for a number of times greater than or equal to a set threshold value, the processing can be executed as follows. Specifically, the calculation unit 501 can determine the waiting time lastly calculated in step S703 as the final estimation result. With this configuration, the calculation unit 501 can prevent time taken for executing the processing from being increased.

In the processing in FIG. 8, in a case where the calculation unit 501 determines that a difference between the waiting time of the waiting queue calculated in step S703 and the acquisition period is greater than or equal to the set threshold value in step S704, even though the processing in steps S702 and S703 is executed for a number of times greater than or equal to a set threshold value, the processing can be executed as follows. Specifically, from among the waiting times calculated in step S703, the calculation unit 501 can determine a waiting time corresponding to a smallest difference when comparing the value with the set threshold value in step S704 as the final estimation result. In this way, the calculation unit 501 can acquire a more appropriate estimation result while preventing the time taken for executing the processing from being increased.

In the processing in FIG. 8, in a case where the calculation unit 501 determines that a difference between the waiting time of the waiting queue calculated in step S703 and the acquisition period is greater than or equal to the set threshold value in step S704, even though the processing in steps S702 and S703 is executed for a number of times greater than or equal to a set threshold value, the processing can be executed as follows. Specifically, the calculation unit 501 can update the acquisition period to a pre-set value, e.g., a period from a time point when a waiting queue has started to be formed to the current time, and execute processing in steps S702 and S703 to determine a waiting time calculated in step S703 as the final estimation result. In this way, the calculation unit 501 can acquire a more appropriate estimation result while preventing the time taken for executing the processing from being increased.

In the present exemplary embodiment, the waiting time estimation system acquires a waiting time of the waiting queue while updating the history information used for executing the estimation processing of the waiting time of the waiting queue. Then, when a difference between a period corresponding to the history information used for the estimation processing of the waiting time of the waiting queue and the acquired waiting time is less than a threshold value, the waiting time estimation system assumes that estimation is executed appropriately and determines the acquired waiting time as a final estimation result.

In the processing according to the present exemplary embodiment, an estimation result closer to the state of the past waiting queue is determined as a final estimation result. Thus, the waiting time estimation system can estimate the estimation result according to the actual state of the past waiting queue.

In another exemplary embodiment, the waiting time estimation system estimates the waiting time of the waiting queue based on the history information during a period just before the current time as the acquisition time. In yet another exemplary embodiment, the waiting time estimation system estimates the waiting time of the waiting queue based on the history information during a period other than a period just before the current time as the acquisition time.

Hereinafter, the processing of a second exemplary embodiment will be described. The processing of the second exemplary embodiment is similar to the processing described in the first exemplary embodiment except for the initial value of the acquisition period and the processing in step S705.

Figure 12:
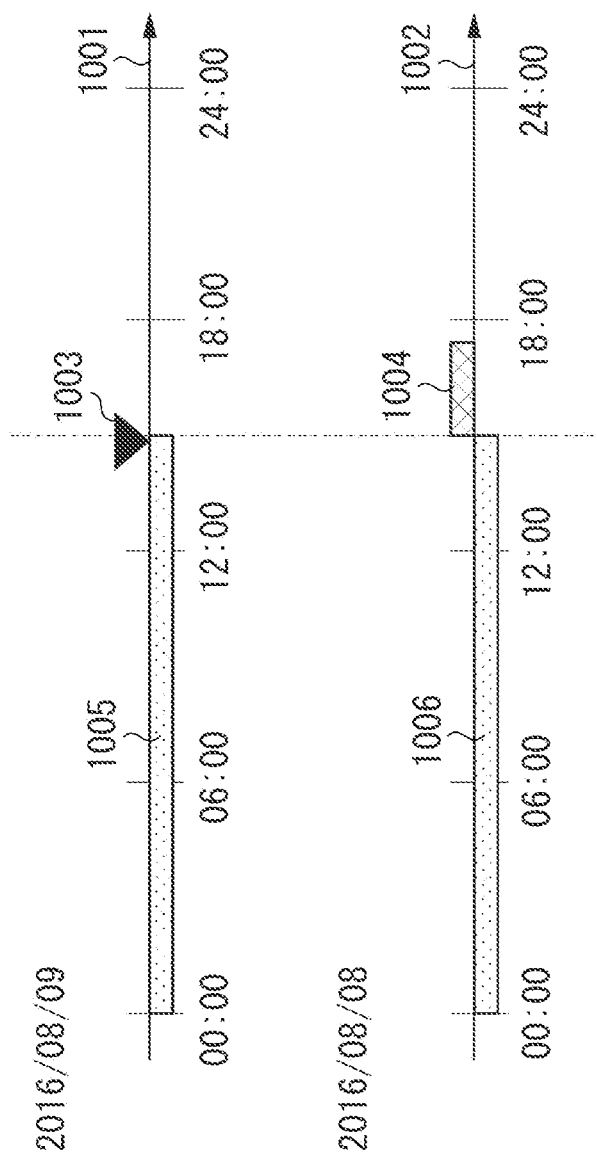
FIG. 12 is a diagram illustrating an acquisition period.

FIG. 12 is a diagram illustrating an example of the acquisition period of the present exemplary embodiment.

A time line 1001 indicates time of a current day, i.e., 8 Aug. 2016, and hereinafter, simply referred to as "current day", when the estimation processing of a waiting time of a waiting queue is executed. Time 1003 is current time (16:00) when the estimation processing of the waiting time of the waiting queue is executed. A time line 1002 indicates time of a day different from the day when the estimation processing of the waiting time of the waiting queue is executed. In the present exemplary embodiment, the time line 1002 indicates time of the previous day, i.e., 8 Aug. 2016.

In the present exemplary embodiment, the calculation unit 501 requests history information during a period just after the time the same as the current time on the previous day, i.e., 16:00 on 8 Aug. 2016, from the detection unit 105. In other words, in the example in FIG. 12, an initial value of the acquisition period is a period just after the time the same as the current time on the previous day. A period 1004 indicates the acquisition period.

In step S705, the calculation unit 501 updates the acquisition period as a period having the same length as the waiting period just after the time calculated in step S703, the time being the same as the current time on the previous day.

In other words, the waiting time estimation system uses the history information during a period just after the time the same as the current time to estimate the waiting time of the waiting queue. In this way, the waiting time estimation system can also take the future trend of the waiting queue into consideration, and thus the waiting time of the waiting queue can be estimated more precisely.

The initial value of the acquisition period is set to be a period on a previous day of an execution day of the estimation processing of the waiting time of the waiting queue. The acquisition period is updated as a period on the previous day of the execution day of the estimation processing of the waiting time of the waiting queue in step S705. The calculation unit 501 can, for example, receive specification about a date from the user based on the user's operation input through the input device 120 to determine a period of the received date as the initial value or the update value of the acquisition period.

The calculation unit 501 can execute the following processing based on the history information during a period 1005 up to the current time of the current day. Specifically, the calculation unit 501 acquires a time period when objects moved out of the waiting queue of the current day and feature of variation in number thereof and a time period when objects moved out of the waiting queue of a period up to time the same as the current time of one past day different from the current day (e.g., period 1006) and feature of variation in number thereof. Then, when the acquired features are similar to each other, the calculation unit 501 determines that the feature of the different day is similar to that of the current day, and uses the period on that different day as the acquisition period. For example, the calculation unit 501 can determine that the features are similar to each other if a difference between the acquired features is less than a set threshold value, and can determine that the features are not similar to each other if a difference is equal to or greater than the threshold value.

The calculation unit 501 can, for example, determine whether the features of the current day and the different day are similar to each other by executing the following processing based on the history information about the current day and the history information about that different day. Specifically, the calculation unit 501 acquires a number of objects having moved out of the waiting queue during a certain time period based on the history information about the different day, and acquires a number of objects having moved out of the waiting queue during that certain time period based on the history information about the current day. Then, the calculation unit 501 acquires a difference between the acquired numbers of objects having moved out of the two waiting queues. As described above, with respect to the entire time period stored in the history information of the current day and a time period of the different day corresponding thereto, the calculation unit 501 acquires differences between the numbers of objects having moved out of the waiting queues and sums up the acquired differences. The calculation unit 501 can determine that the features of the current day and the different day are similar to each other if the total value is less than a set threshold value, and can determine that the features of the current day and the different day are not similar to each other if the total value is greater than or equal to the threshold value.

The calculation unit 501 can execute the following processing based on a time period when objects moved out of the waiting queue of the current day and a variation range of variation in number thereof and a time period when objects moved out of the waiting queue during a period until the same time as the current time of the different day and a variation range of variation in number thereof. In other words, the calculation unit 501 can acquire a ratio between the two variation ranges as a coefficient to determine a value acquired by multiplying the calculated waiting time by the coefficient as the final estimation result. The ratio between the two variation ranges is one example of the coefficient according to the difference between history information of two days.

As described above, in the present exemplary embodiment, the waiting time estimation system uses a period on one day other than the execution day of the estimation processing of the waiting time of the waiting queue as the acquisition period. In this way, the waiting time estimation system can estimate the waiting time of the waiting queue more precisely by using the appropriate acquisition period.

A system configuration of the waiting time estimation system, a hardware configuration and a functional configuration of each of the system constituent elements of the present exemplary embodiment are similar to those described in the first exemplary embodiment.

In the first and the second exemplary embodiments, the waiting time estimation system acquires a number of objects moving out of the waiting queue per unit time from the history information. Then, the waiting time estimation system estimates the waiting time of the waiting queue based on the acquired number of objects and a number of objects included in the current waiting queue.

In a third exemplary embodiment, the waiting time estimation system acquires time taken for objects of the same number as the number of objects included in the current waiting queue to have moved out of a waiting queue in the past based on the history information, and determines the acquired time as the estimation result of the waiting time of the waiting queue.

A system configuration of the waiting time estimation system, a hardware configuration, and a functional configuration of each of the system constituent elements of the present exemplary embodiment are similar to those described in the first exemplary embodiment.

The processing of the present exemplary embodiment will be described below.

Similar to the processing in step S601, the calculation unit 501 acquires a number of objects included in the waiting queue from the waiting queue calculation unit 106. For example, the calculation unit 501 acquires history information during a period from a time point when the waiting queue is formed to the current time from the detection unit 105. Then, based on the acquired history information, the calculation unit 501 acquires time taken for objects of the same number as that of objects included in the waiting queue to move out. For example, the calculation unit 501 executes the following processing.

Specifically, the calculation unit 501 determines a period from move-out time of an object included in the current waiting queue that has moved out at a certain number "nth" in order from the last from among the objects that have moved out of the waiting queue to the current time as the estimation result of the waiting time of the waiting queue.

The calculation unit 501 identifies move-out time of an object that has moved out of the waiting queue the latest from among the objects that have moved out of the waiting queue up to the current time. Next, the calculation unit 501 identifies the move-out time of the object included in the current waiting queue that has moved out at a certain number "nth" in order from the last from among the objects that have moved out of the waiting queue. Then, the calculation unit 501 can determine a difference between the identified move-out times as the estimation result of the waiting time of the waiting queue.

The calculation unit 501 can determine a period from set time to move-out time of an object included in the current waiting queue that has moved out at a certain number "nth" in order as the estimation result of the waiting time of the waiting queue. For example, this set time is time the same as the current time of the previous day. The calculation unit 501 can identify a day similar to the current day in feature when the estimation processing of the waiting time is executed based on the history information about a plurality of days to determine the same time as the current time on that identified day as the set time.

The calculation unit 501 can, for example, determine whether a comparison target day and the current day are similar in feature to each other by executing the following processing based on the history information on the current day and the history information on the comparison target day. More specifically, the calculation unit 501 acquires a number of objects having moved out of the waiting queue during a certain time period based on the history information of the comparison target day, and acquires a number of objects having moved out of the waiting queue during that certain time period based on the history information on the current day. Then, the calculation unit 501 acquires a difference between the acquired numbers of objects having moved out of the two waiting queues. As described above, with respect to the entire time period stored in the history information on that day and a period of the comparison target day corresponding thereto, the calculation unit 501 acquires differences between the numbers of objects having moved out of the waiting queues and sums up the acquired differences. The calculation unit 501 can determine that the current day and the comparison target day are similar in feature to each other if the total value is less than a set threshold value, and can determine that the current day and the comparison target day are not similar in feature to each other if the total value is the greater than or equal to the threshold value.

The calculation unit 501 can identify history information during another period similar to history information during a set period just before the current time to determine an end point of a period corresponding to the identified history information as the set time.

Through the above-described processing, the waiting time estimation system can estimate the waiting time of the waiting queue more precisely based on the history information more similar to the current state.

As described above, in the present exemplary embodiment, the waiting time estimation system determines time taken for objects of the same number as the number of objects included in the current waiting queue to have moved out of the waiting queue as the estimation result of the waiting time of the waiting queue.

As described above, the waiting time estimation system can estimate the waiting time of the waiting queue more precisely by determining the time actually taken for objects of the same number as the number of objects currently waiting in a queue to move out as the estimation result.

Other Exemplary Embodiments

In the first to third exemplary embodiments, the waiting time estimation system acquires the number of objects included in the waiting queue and detects the objects moving out of the waiting queue based on the images captured by the network cameras 102 and 103. However, the waiting time estimation system can execute the following processing if a sensor such, as an infrared sensor, is provided thereto.

For example, sensors such as an infrared sensor and other sensors can be arranged in the peripheral portions of the waiting queue's entrance and exit. Thus, the waiting time estimation system can detect the object, such as a person entering or moving out of the waiting queue, via the sensors. In this way, the waiting time estimation system can detect the object moving out of the waiting queue and stores the detected information in the memory 110 as the history information. The waiting time estimation system can acquire the number of objects included in the waiting queue by adding up the number of detected objects passing through the entrance and subtracting the number of detected objects passing through the exit from the added value. The waiting time estimation system can use network cameras in combination with the sensors such as the infrared sensor and other sensors.

One or more functions according to the above-described exemplary embodiments can be realized by supplying a program to a system or an apparatus via a network or a storage medium, by one or more processors in the system or the apparatus reading and executing the program. The one or more functions can also be realized with a circuit, e.g., application specific integrated circuit (ASIC)).

While exemplary embodiments of the present invention have been described, the above-described exemplary embodiments are not seen to be limiting.

For example, all or a part of the functional configurations of the above-described waiting time estimation system can be integrated with on the information processing apparatus 100 as hardware.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-224965, filed Nov. 18, 2016, which is hereby incorporated by reference herein in its entirety.

What is claimed is:

1. An information processing apparatus comprising:
a storage device storing instructions; and
one or more computers executing the instructions that cause the one or more computers to function as:
an acquisition unit configured to acquire a number of objects included in a queue; and
an estimation unit configured to estimate a waiting time of the queue based on the number of objects acquired by the acquisition unit and a number of objects having passed through a position within a set period, wherein the position corresponds to an exit of the queue,
wherein the estimation unit updates the set period in response to a result of comparing the estimated waiting time and the set period, and re-estimates the waiting time of the queue based on the number of objects acquired by the acquisition unit and a number of objects having passed through the position within the updated set period.

2. The information processing apparatus according to claim 1, wherein the estimation unit acquires the number of objects having passed through the position within the set period and estimates the waiting time of the queue based on the acquired number of objects having passed through the position within the set period and the acquired number of objects included in the queue.

3. The information processing apparatus according to claim 1, wherein the estimation unit estimates the waiting time of the queue based on the acquired number of objects included in the queue and a number of objects having passed through the position within the set period that is a period just before a current time on a current day.

4. The information processing apparatus according to claim 1, wherein the estimation unit estimates the waiting time of the queue based on the acquired number of objects included in the queue and a number of objects having passed through the position within the set period on a set day different from a current day.

5. The information processing apparatus according to claim 1,
wherein in a case where a difference between the set period and the estimated waiting time is satisfied with a predetermined condition, the estimation unit determines the estimated waiting time as a final estimation result, and
wherein in a case where the difference is not satisfied with the predetermined condition, the estimation unit updates the set period and re-estimates the waiting time of the queue based on the number of objects acquired by the acquisition unit and a number of objects having passed through the position within the updated set period.

6. The information processing apparatus according to claim 5,
wherein in a case where the difference is less than a threshold value, the estimation unit determines the estimated waiting time as a final estimation result, and
wherein in a case where the difference is not less than the threshold valued, the estimation unit updates the set period and re-estimates the waiting time of the queue based on the number of objects acquired by the acquisition unit and a number of objects having passed through the position within the updated set period.

7. The information processing apparatus according to claim 5, wherein in a case where the difference is not satisfied with the predetermined condition, the estimation unit updates the set period into the updated period which corresponds to a length of the estimated waiting time, and re-estimates the waiting time of the queue based on the number of objects acquired by the acquisition unit and a number of objects having passed through the position within the updated set period.

8. The information processing apparatus according to claim 7, wherein, in a case where the difference is not satisfied with the predetermined condition and the waiting time of the queue is estimated for a set number of times, the estimation unit determines the estimated waiting time estimated at a last time as a final estimation result.

9. The information processing apparatus according to claim 7, wherein, in a case where the difference is not satisfied with the predetermined condition and the waiting time of the queue is estimated for a set number of times, the estimation unit determines the estimated waiting time having a smallest difference with the set period as a final estimation result.

10. An information processing method executed by an information processing apparatus, comprising:
acquiring a number of objects included in a queue;
estimating a waiting time of the queue based on the acquired number of objects and a number of objects having passed through a position within a set period, wherein the position corresponds to an exit of the queue;
updating the set period in response to a result of comparing the estimated waiting time and the set period; and
re-estimating the waiting time of the queue based on the acquired number of objects and a number of objects having passed through the position within the updated set period.

11. A non-transitory computer-readable storage medium storing a program for causing a computer to execute an information processing method, the information processing method comprising:
acquiring a number of objects included in a queue;
estimating a waiting time of the queue based on the acquired number of objects and a number of objects having passed through the position within a set period, wherein the position corresponds to an exit of the queue;
updating the set period in response to a result of comparing the estimated waiting time and the set period; and
re-estimating the waiting time of the queue based on the acquired number of objects and a number of objects having passed through the position within the updated set period.

* * * * *